UNITED STATES PATENT OFFICE.

LEO F. CANNING, OF MUNCIE, INDIANA.

PLUMBER'S CEMENT.

No Drawing. Application filed March 28, 1927. Serial No. 179,194.

Patented Feb. 28, 1928. 1,661,065

This invention relates to a cementitious compound of special importance in the plumbers' craft to produce a water-proof and gas-proof joint and to give great stability to the union. The material, however, is of use in other arts where a strong water-proof union is desired. Nearly all the compounds heretofore employed in making pipe joints are oils combined with a solid powder of some metallic salt formed into a paste with the oil. While compositions of this character serve well by their oil content to resist rust or corrosion and permit subsequent disunion without destruction of the joined parts, they do not, however, withstand ordinary solvents of oil such as kerosene, gasoline, benzol, or the like, which on coming into contact with the union in a short time promote leakage.

In my cementitious composition the oil is replaced by a syrupy solution containing silicate of soda, glycerine, oxide of iron, and graphite as essential ingredients, to which a very minor content of dry soap may be added. The graphite adds lubricating value to the composition which is accentuated by the soap content and permits the threaded metal parts to be screw connected readily and leave a film at the joint which under hardening after a period of drying and under atmospheric conditions, and especially exposure to hot moisture or steam, causes a reaction between the alkaline silicate and ferric oxide, producing a solidified bond somewhat in the nature of artificial stone of great strength and insolubility.

The body of the formula is constituted by the ferric oxide and graphite and its setting value is given by the liquid glass or silicate of soda. Glycerine and soap constitute a preservative, while the water simply forms diluent to make a pasty consistency convenient for application. The material made in bulk is kept closely covered and sufficient for use extracted from time to time. The soap employed is preferably in the form of soap chips and is not an absolutely essential ingredient, but may be replaced by an equivalent quantity of glycerine. The powdered solid ingredients are reduced to an impalpable powder and it is important that the several ingredients should be thoroughly and uniformly incorporated.

In proceeding to prepare the cement I mix the graphite and iron ore, which latter is preferably in the form of spent ferric oxide taken of each in percentage proportions of 25% by weight. Then I place 1% of hard soap chips in hot water and cause it to thoroughly dissolve, then adding 5% of glycerine (40% pure) and thoroughly emulsifying the mixture. I then mix the graphite and iron thoroughly and mutually incorporate it together with the soap and glycerine mixture with sufficient water to form a paste. I then add the liquid glass in 12.5% proportion, this ingredient being of a density of 60 Baumé. I then add sufficient water in the proportion of 31½% and reduce the matter by stirring to an intimate uniform mixture, after which it may be strained and placed in an air-tight container from which it may be withdrawn for use as occasion requires.

While I prefer to form my compound in the proportions noted, they may be varied within reasonable limits without destroying the practical efficiency of the cement. As stated, the soap may be omitted and be replaced by an equal quantity of glycerine without substantially destroying the value of the cement. The water is added in such amount as needed to give suitable plasticity to the compound, and while in storage loss may be compensated by additional water with thorough incorporation. The compound in use, especially in pipe joints which may be subjected to heat and moisture, will only be improved by reactions of the elements under moist heat conditions, tending to promote the reaction between the silicate and metallic elements to produce a more effective resistance to leakage under pressure or the ingress of air or moisture.

What I claim is:—

1. A plumber's cement containing glycerine 5, graphite 25, ferric oxide 25, and silicate of soda 12.5.

2. A plumber's cement comprising an intimate incorporation in the following ingredient proportions: soap chips 1, glycerine 5, graphite 25, ferric oxide 25, silicate of soda 12.5, and water 31.5.

In testimony whereof I affix my signature.

LEO F. CANNING.